United States Patent [19]
Doyle et al.

[11] Patent Number: 6,055,315
[45] Date of Patent: Apr. 25, 2000

[54] DISTRIBUTED SCRAMBLING METHOD AND SYSTEM

[75] Inventors: John F. Doyle, Campbell; Stephen C. Snell, Aptos; Timothy Dunn, Mountain View, all of Calif.

[73] Assignee: ICTV, Inc., Los Gatos, Calif.

[21] Appl. No.: 09/206,529

[22] Filed: Dec. 7, 1998

Related U.S. Application Data

[60] Provisional application No. 60/067,990, Dec. 9, 1997.

[51] Int. Cl.[7] .................................................. H04N 7/167
[52] U.S. Cl. .......................... 380/242; 380/241; 380/239; 380/236; 380/221; 348/12; 345/327
[58] Field of Search .................................. 380/10, 15, 9, 380/200, 210, 211, 216, 221, 222, 223, 226, 239, 240, 241, 242; 348/12, 13, 17; 345/327

[56] References Cited

U.S. PATENT DOCUMENTS

| | | | |
|---|---|---|---|
| 3,997,718 | 12/1976 | Ricketts et al. | 178/6.8 |
| 4,081,831 | 3/1978 | Tang et al. | 358/114 |
| 4,222,068 | 9/1980 | Thompson | 358/120 |
| 4,253,114 | 2/1981 | Tang et al. | 358/114 |
| 4,264,924 | 4/1981 | Freeman | 358/86 |
| 4,264,925 | 4/1981 | Freeman et al. | 358/86 |
| 4,290,142 | 9/1981 | Schnee et al. | 455/3 |
| 4,408,225 | 10/1983 | Ensinger et al. | 358/120 |
| 4,454,538 | 6/1984 | Toriumi | 358/86 |
| 4,466,017 | 8/1984 | Banker | 358/120 |
| 4,471,380 | 9/1984 | Mobley | 358/120 |
| 4,475,123 | 10/1984 | Dumbauld et al. | 358/114 |
| 4,523,228 | 6/1985 | Banker et al. | 358/120 |
| 4,553,161 | 11/1985 | Citta | 358/86 |
| 4,567,517 | 1/1986 | Mobley | 358/120 |
| 4,614,970 | 9/1986 | Clupper et al. | 358/120 |
| 4,670,904 | 6/1987 | Rumreich | 380/15 |
| 4,769,838 | 9/1988 | Hasegawa | 380/7 |
| 4,823,386 | 4/1989 | Dumbauld et al. | 380/13 |
| 4,864,613 | 9/1989 | Van Cleave | 380/10 |
| 4,912,760 | 3/1990 | West, Jr. et al. | 380/7 |
| 4,922,532 | 5/1990 | Farmer et al. | 380/15 |
| 4,989,245 | 1/1991 | Bennett | 380/23 |
| 4,995,078 | 2/1991 | Monslow et al. | 380/10 |
| 5,008,934 | 4/1991 | Endoh | 380/15 |
| 5,058,160 | 10/1991 | Banker et al. | 380/20 |
| 5,230,019 | 7/1993 | Yanagimichi et al. | 380/21 |
| 5,412,720 | 5/1995 | Hoarty | 380/15 |
| 5,442,700 | 8/1995 | Snell et al. | 380/15 |
| 5,446,490 | 8/1995 | Blahut et al. | 348/7 |
| 5,497,187 | 3/1996 | Banker et al. | 348/6 |
| 5,526,034 | 6/1996 | Hoarty et al. | 348/7 |
| 5,550,578 | 8/1996 | Hoarty et al. | 348/7 |

(List continued on next page.)

FOREIGN PATENT DOCUMENTS

| | | |
|---|---|---|
| 682776 | 3/1964 | Canada . |
| 0 449 633 | 10/1991 | European Pat. Off. . |
| 2 290 204 | 12/1995 | United Kingdom . |

*Primary Examiner*—Gail O. Hayes
*Assistant Examiner*—Trevor Quick Coddington
*Attorney, Agent, or Firm*—Bromberg & Sunstein LLP

[57] ABSTRACT

A scrambling system for a cable television system in which a group of channel frequencies are reused over a plurality of service areas includes an access controller, an encoder and a plurality of simplified scrambling units. Each service area receives different television signals on the group of channel frequencies. The access controller provides signal authorization information for a given channel frequency to a plurality of receiver/decoders located in the different services areas. The access controller also provides descrambling information corresponding to the signal authorization information to the encoder for the given channel frequency. The encoder produces a conditional access code by placing the descrambling information into a scrambled reference signal. An extracting unit removes the conditional access code from the scrambled reference signal and distributes the conditional access code to each of the simplified scrambling units operating at the given channel frequency. Each simplified scrambling unit scrambles the television signal that is to be delivered to its respective service area and inserts the conditional access code into the scrambled television signal.

10 Claims, 6 Drawing Sheets

U.S. PATENT DOCUMENTS

| | | | |
|---|---|---|---|
| 5,557,316 | 9/1996 | Hoarty et al. | 348/7 |
| 5,587,734 | 12/1996 | Lauder et al. | 348/10 |
| 5,631,693 | 5/1997 | Wunderlich et al. | 348/7 |
| 5,710,815 | 1/1998 | Ming et al. | 380/20 |
| 5,818,438 | 10/1998 | Howe et al. | 345/327 |
| 5,883,661 | 3/1999 | Hoarty | 348/7 |

DISTRIBUTED SCRAMBLING METHOD AND SYSTEM

FIELD OF THE INVENTION

This application claims priority from co-pending U.S. Provisional Application No. 60/067,990, filed Dec. 9, 1997, the full disclosure of which is hereby incorporated by reference herein.

The present invention is related to cable television systems, particularly those providing private channels on demand to users for interactive-type services.

BACKGROUND OF THE INVENTION

Bandwidth problems have long restricted the ability of cable television systems to provide private information services to subscribers. Such information services may include Internet access, video-on-demand, games, catalogs, etc. Private services may also include allowing the user to select from among hundreds of less popular programming that is thus made available only on a demand basis. One solution to the limits on system bandwidth has been to assign a portion of cable system bandwidth to conventional or popular channels that are universally broadcast to all subscribers. The remaining available channels are then available for assignment to requesting subscribers on a demand basis.

One such system for providing interactive services on a demand basis is described in U.S. Pat. No. 5,550,578; U.S. patent application Ser. No. 08/551,461 filed Nov. 1, 1995 and U.S. patent Ser. No. 08/987,405 filed Dec. 9, 1997. The full disclosure of each of these patent references is hereby incorporated by reference herein. Basically, the cable service distribution network divides the subscriber pool into various service areas, each served by a different trunk. A first group of channels broadcast to all service areas may provide conventional channels on channels 2 to 73 for example. A second group of channels, 74 to 79, for example, may be reserved for private information services. While the information on channels 2 to 73 is the same in each service area, the information on channels 74 to 79 is different in each service area. Of these channels, those that are in use are individually assigned to a requesting subscriber. A subscriber in one service area may be interacting on channel 74 at the same time a different subscriber in a different service area was also assigned to channel 74. The headend is equipped with the necessary processing, switching or splitting and combining systems for setting up these private channels on demand.

In order to maintain privacy for the private channels, the television signals must be scrambled for distribution and then decoded only at the assigned subscriber's premises. This can result in an increased cost for the cable provider. Conventional scrambling equipment includes an access controller for furnishing signal authorization information such as a decoding key out of band to the user assigned to the scrambled channel. The equipment scrambles a video signal and includes a conditional access code along with the scrambled signal. The conditional access code provider scrambling parameters to the receiving set top so that the signal can be descrambled. The set top will only descramble if it has permission and knows the decoding key for decoding the scrambling parameters. Instead of requiring one complete scrambler for each channel, when broadcasting subscription services, the cable provider implementing the interactive system will need to purchase a scrambler for each interactive channel multiplied by the number of service areas. Increased costs can be a deterrent to implementing an interactive cable system.

SUMMARY OF THE INVENTION

Embodiments of the present invention are directed to a method and system for distributing descrambling authorization information over a plurality of simplified scrambling units each serving a different service area. The simplified scrambling units lack a direct connection to the access controller. The scrambling distribution system is used in a cable television system in which a group of channel frequencies is reused over a plurality of service areas. At a cable headend, a plurality of simplified scrambling units each deliver television signals to one of the different service areas. Subscribers are provided with receiver/decoders typically housed in set top boxes for delivering a television signal to the subscriber television.

In a preferred embodiment, signal authorization information is provided by an access controller for a given channel frequency. The signal authorization information enables the receiver/decoders to descramble the television signals a subscriber television is permitted to receive. The access controller provides the signal authorization information to receiver/decoders in different service areas all assigned to the given channel frequency. An encoder at the headend receives descrambling information corresponding to the descrambling authorization information. For example, the descrambling authorization information may provide the key for decrypting the descrambling information. The encoder generates a conditional access code on a scrambled reference signal for the given channel.

An extracting unit, in signal communication with the encoder, removes the conditional access code from the scrambled reference signal. In one embodiment, the extracting unit removes the conditional access code from the vertical blanking interval of the reference signal. In another embodiment, the extracting unit removes the conditional access code from the amplitude modulation of the audio subcarrier of the scrambled reference signal. Once the conditional access code is removed, the extracting unit distributes the conditional access code to a plurality of scrambling units.

Each scrambling unit scrambles its respective television signal to be delivered to the service area served by the unit. The scrambling unit also inserts the conditional access code provided by the extracting unit into its scrambled television signal. In a preferred embodiment, the television signal is scrambled by suppressing/offsetting the horizontal and vertical synchronization signal either in baseband or IF. The conditional access code in the scrambled television signal and the signal authorization information from the access controller enable the receiver/decoder to locate and restore the suppressed synchronization signal.

In accordance with embodiments of the invention, only one complete scrambler with a direct connection to an authorization access controller is required for each channel frequency. The authorization access controller is advantageously shared over a plurality of scrambling units producing different television signals for delivery to different service areas but on the same channel frequency. Each scrambling unit then only requires a sync suppressor and access code inserter.

DETAILED DESCRIPTION OF SPECIFIC EMBODIMENTS

Figure 1:
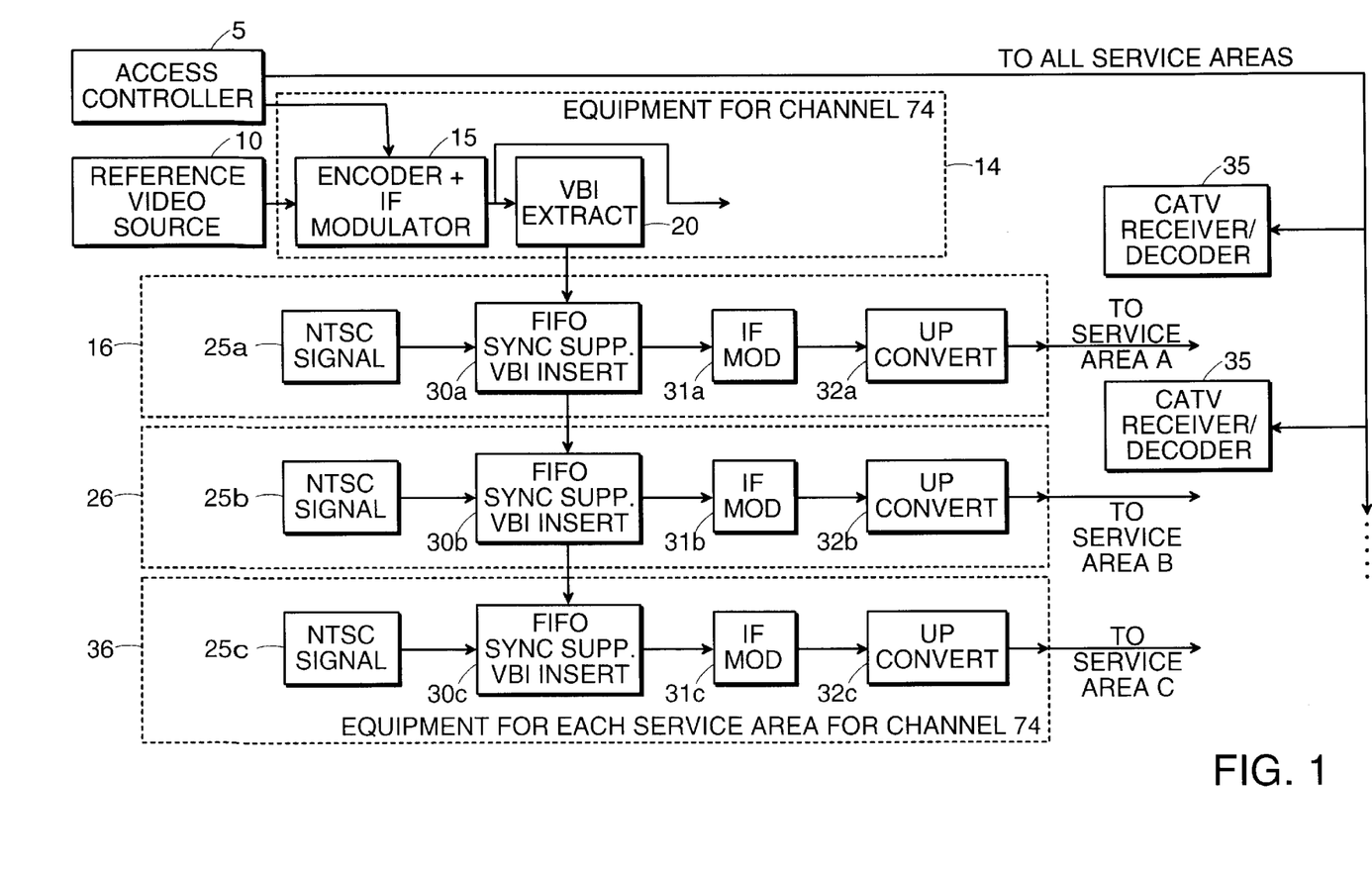
FIG. 1 is a schematic block diagram of a scrambling system of an embodiment of the invention for a given channel.

In FIG. 1, a scrambling system for a given channel (channel 74) is shown. A similar scrambling system would be used for each channel frequency that was being reused for different television signals in different service areas. Each scrambling and rf processing system 16, 26, 36 delivers television signals to a different service area. An access controller 5 is in signal communication over the cable distribution network with a plurality of set top CATV receiver/decoders 35 located at subscriber premises. The access controller 5 addresses the signal authorization in formation to the receiver/decoder 35 that has been assigned to the given channel. All signal authorization information can be broadcast in a frequency band not used for television information throughout the system on a digital signal, each receiver/decoder will read the information addressed to it. The access controller 5 thus performs the act of providing signal authorization information to the receiver/decoders 35. The signal authorization information enables the receiver/decoder to descramble the television information signal on its assigned private channel. Each receiver/decoder is associated with a home interface controller which communicates upstream with the headend during interactive sessions. In interactive mode, a receiver/decoder is assigned a channel on which the requested interactive service is viewed.

The access controller 5 is also in signal communication with a scrambler 14 having an encoder 15. The headend requires one such scrambler 14 for each channel. The access controller 5 performs the act of providing signal descrambling information to the scrambler 14 for each channel. The scrambler 14 services a plurality of scrambling and rf processing systems 16, 26, 36, each serving a different service area. The encoder 15 may be one of general use in the industry. In a preferred embodiment, the encoder is one such as the General Instrument MVP-II. The encoder 15 receives a reference television signal 10, scrambles the television signal, encrypts signal descrambling information from the access controller and adds the encrypted descrambling information to the scrambled reference signal. The descrambling information may include a unique channel tag that identifies the assigned private channel frequency. It may also include scrambling parameters identifying the scrambling methods being used, such as 6 dB or 10 dB suppression and whether or not video inversion is being used.

The resulting encrypted descrambling signal authorization information on the scrambled reference signal is retrieved by an extracting unit 20 and is referred to herein as the conditional access code. In this embodiment, the act of extracting is performed by a vertical blanking interval data extractor. The conditional access code is in the vertical blanking interval of the scrambled reference signal. The extracted conditional access code is advantageously distributed to a plurality of scrambling units. Thus, the scrambling units do not require an encrypter or a direct connection to the access controller.

Once the conditional access code is removed from the scrambled reference signal, it is provided to scrambling units 30a, 30b, 30c, each serving a different service area A, B, C. Each scrambling unit 30a, 30b, 30c uses the same conventional scrambling technology as the encoder 15. In a preferred embodiment, the scrambling unit uses synchronization signal suppression to perform the act of scrambling a television signal 25a, 25b, 25c. The television signal 25a is the signal to be provided to the assigned subscriber set top. In addition, the scrambling unit 30a performs the act of inserting at a synchronized location the conditional access code provided by the extracting unit 20 into the television signal. A FIFO may be used to receive the conditional access code data from the extracting unit 20 and make it available for insertion. Once the scrambler suppresses the synchronization signal of the television signal, the television signal modulates an IF local oscillator 31a forming an intermediate frequency (IF) signal. An up converter 32a then places the scrambled and modulated television signal containing the conditional access code onto a frequency determined by the assigned channel. The television signal, including the conditional access code is thereafter delivered, through the cable network on the trunk of the appropriate service area to the set top of the subscriber. The set top then has the signal authorization information from the access controller and the conditional access code on the television signal so that the television signal can be descrambled. This process occurs for each service area that is handling an interactive session on the given channel.

Figure 2:
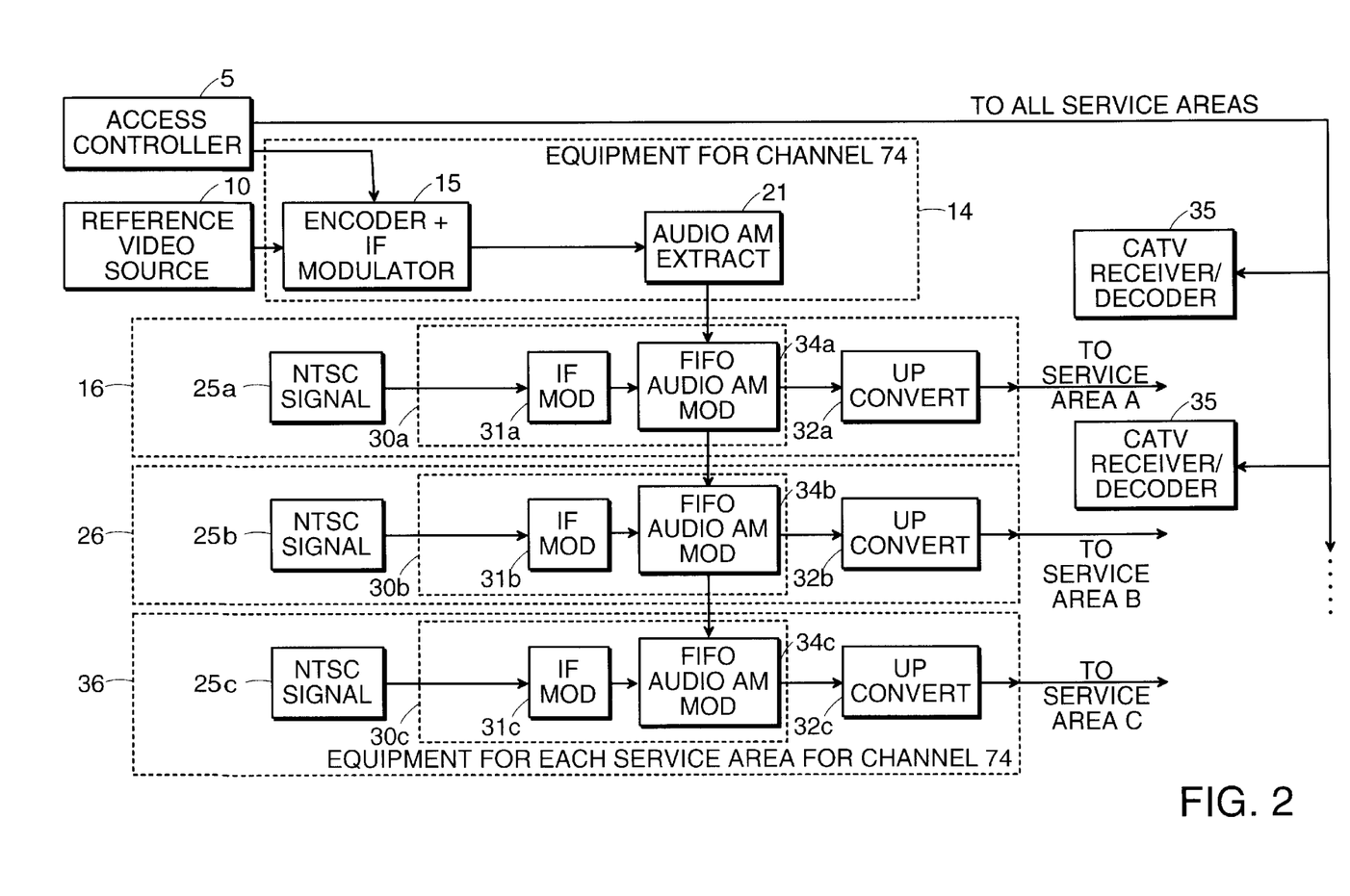
FIG. 2 is a schematic block diagram of a scrambling system of an alternate embodiment of the invention for a given channel.

FIG. 2 shows an alternative embodiment of the scrambling system. The encrypted descrambling signal authorization information is extracted from the amplitude modulation of the audio subcarrier of the scrambled reference signal by extracting unit 21. The extracting unit 21 is in signal communication with the encoder 15. The extracted conditional access code is delivered to a plurality of scrambling units. The scrambling unit 30a scrambles a television signal 25a using basic scrambling technology and inserts the conditional access code into the television signal 25a. In this embodiment, the scrambler must be of the type that includes an amplitude modulation 34a, 34b, 34c of the television audio subcarrier for inserting the conditional access code.

Figures 3, 3A:
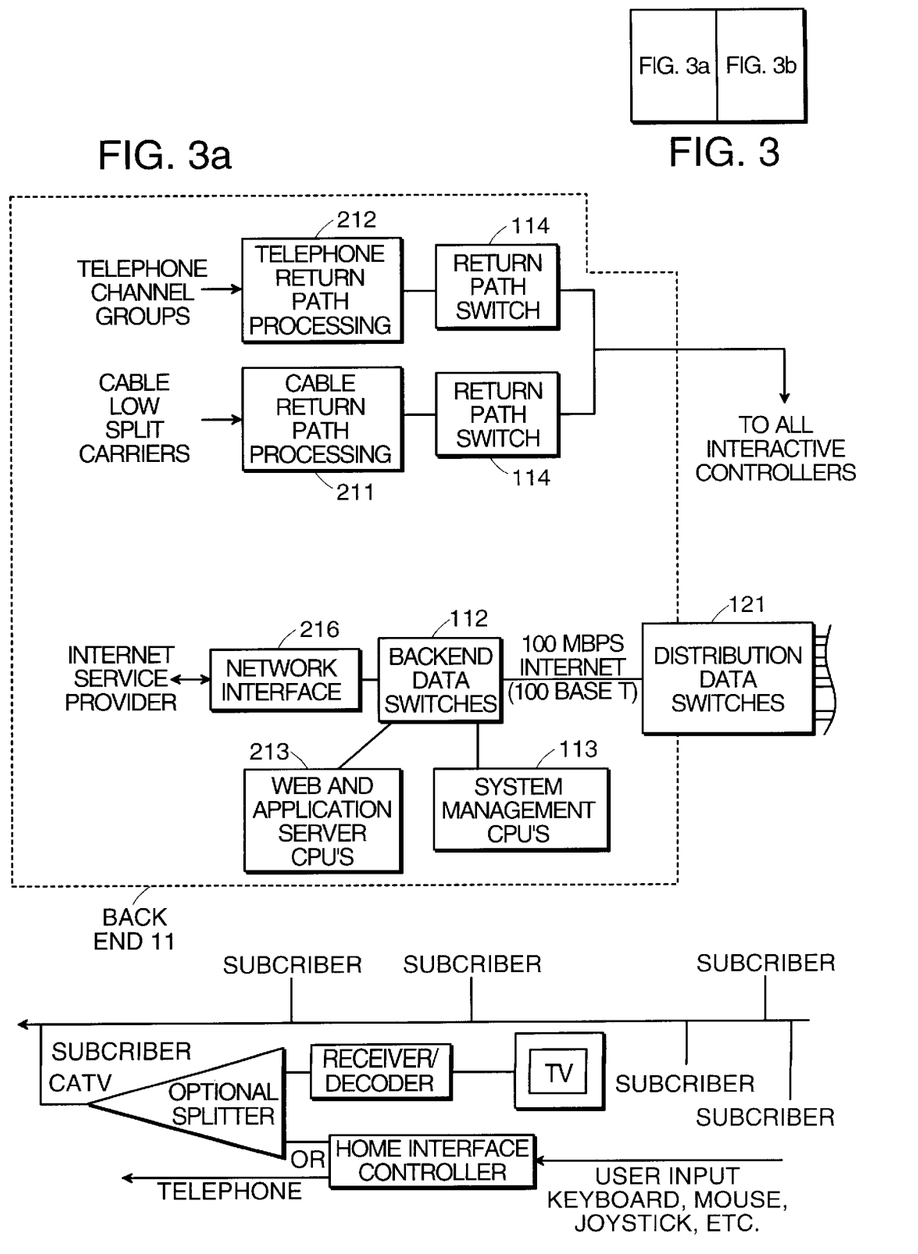
FIGS. 3, 3a & 3b are schematic, block diagrams of a cable television system incorporating the scrambling system of FIGS. 1 or 2.
Figure 3B:
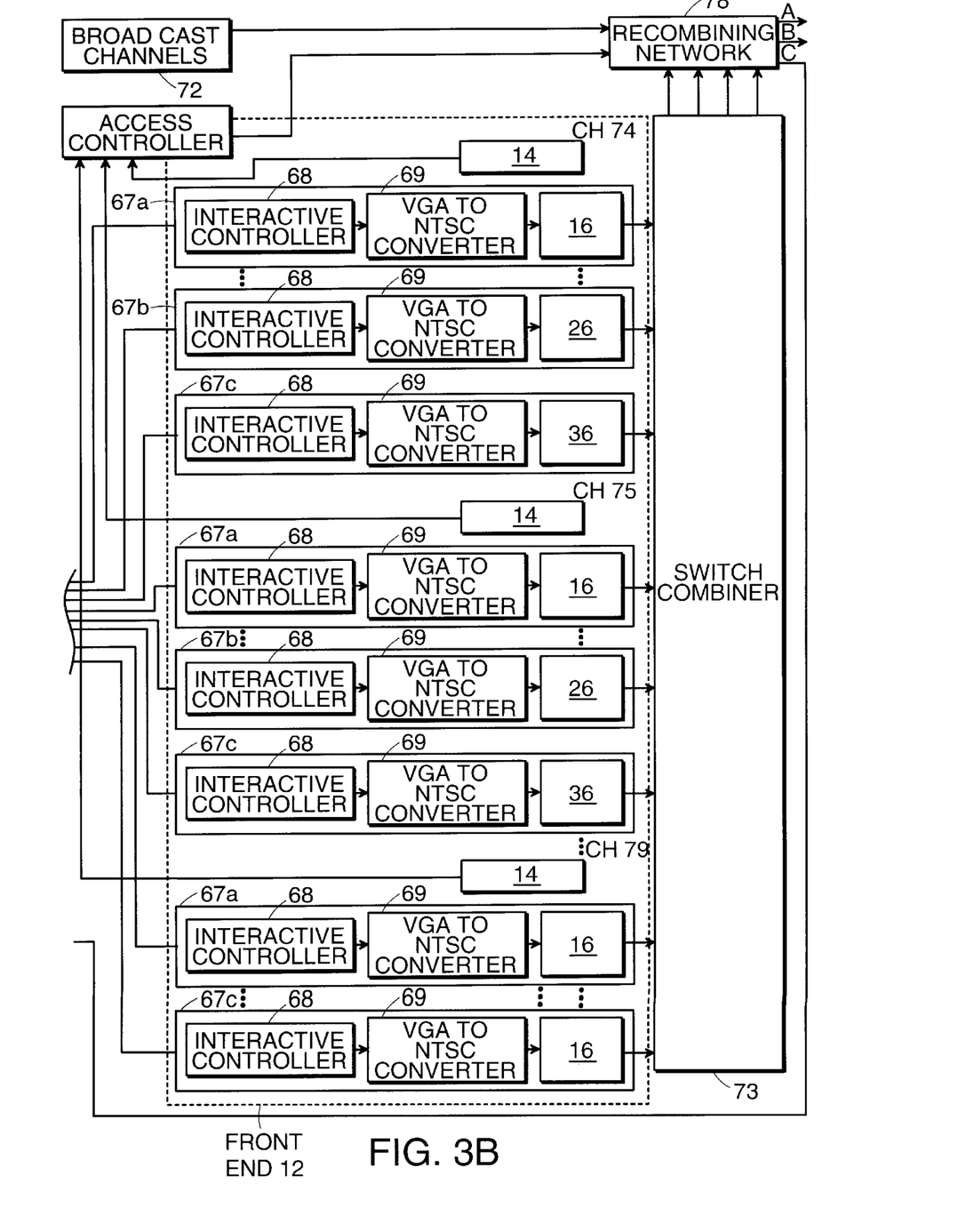

FIG. 3 shows a cable television system incorporating an interactive home information system with the scrambling system of FIGS. 1 or 2. The cable television system reuses a band of interactive channels for each of a plurality of service areas (A, B, C). A separate trunk for each service area carries cable signals to the group of receiver/decoders 35 served by the respective service area. In FIG. 3, the system is shown divided into a back end 11 and a front end 12. In the back end 11, network interface 216 is in communication with an Internet service provider. Back end switches 112 make the Internet available to interactive control modules 67a, 67b, 67c. Each interactive control module includes an interactive controller 68, that has a processor for interacting with the subscriber and providing the TV picture information. When that picture information is in computer VGA display format, a converter 69 in the module produces an NTSC or PAL signal for television display. The television display signal is provided to a scrambling and rf processing system 16, 26, 36. These systems perform scrambling, modulating and upconverting as described above with respect to FIGS. 1 and 2. The interactive control module of a preferred embodiment includes everything from the interactive controller to the up converter. The module is described in more detail in the portion of copending U.S. Provisional Application No. 60/067,990, filed Dec. 9, 1997, entitled "Modular Controller and Modular System for Interactive Cable Television System." The full disclosure of the copending application has been incorporated by reference herein.

The Web and Application server processes 213 make web-browsing or other interactive processes like games, catalogs or other interactive information services available through the back end switches to the interactive controller. System management 113 supervises the switching and sets up connections between a requesting subscriber and an interactive controller 67. System management 113 assigns interactive controller modules to requesting subscribers on a demand basis. Distribution data switches 121 connect the information sources including the Internet to the interactive controllers. Return path communications from a home interface controller to the headend may be directed through a telephone line or a cable return path depending upon the capabilities of the particular cable system. The figure shows that alternative return paths include either telephone return path processing 212 or cable return path processing 211. Return path switches 114 are controlled by system management 113 to connect the return signals with the assigned interactive controller. Home interface controllers may be housed in the set top with the CATV receiver/decoder or in a separate box. The home interface controller receives control signals from a subscriber selection device such as a TV remote, a keyboard, a joystick, etc. Such signals are sent upstream to interact with the assigned interactive controller. Interactive channels are individually assigned to requesting home interface controllers. System management can either make the assignment or make a list of available channels known to the home interface controllers so that they can select one from among those that are available when interactive service is requested by the subscriber. System management 113 confirms the assigned channel frequency with the home interface controller so that its associated receiver/decoder or television can be tuned to that channel.

A switcher combiner 73 takes the scrambled and modulated television signals from the interactive controller modules and combines those directed to the same service area. The combined interactive signals are combined with conventional broadcast channels 72 and the signal authorization information produced by the access controller 5 that go to all service areas in a recombining network 78. The signal authorization information is individually addressed to its assigned subscriber for reading by the assigned receiver/decoder. The receiver/decoders when tuned to a scrambled channel will be monitoring the out-of-band frequency on which the access controller is sending out the signal authorization information. The combined signals for each service area are transmitted over the service area's respective trunk.

Figure 4:
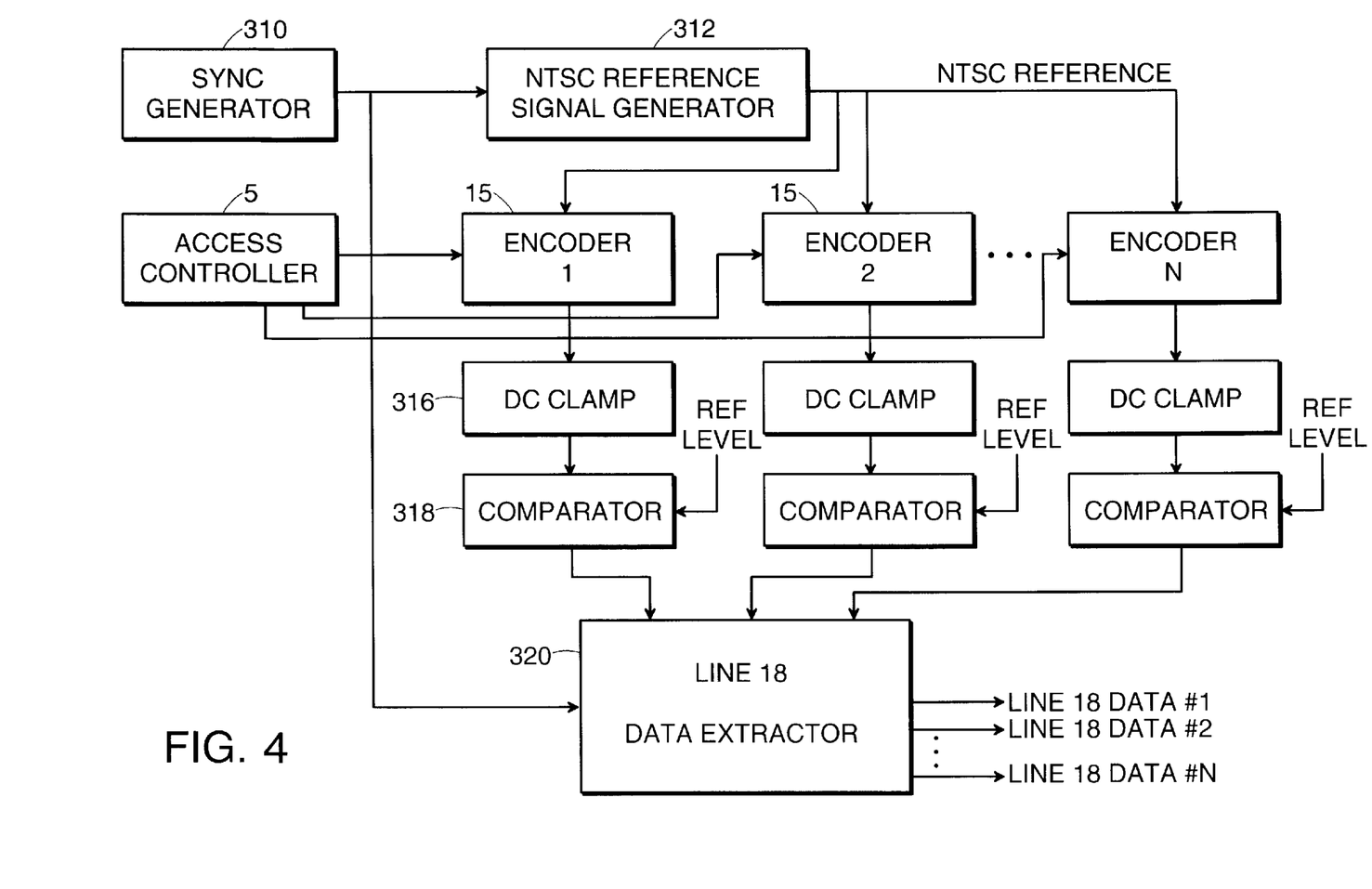
FIG. 4 is a schematic block diagram of the scramblers used for authorization code extraction in the scrambling system of FIG. 1.

Referring now to FIG. 4, the scramblers 14 used for authorization code extraction are shown. A sync generator 310, such as an SAA1101T generates NTSC sync timing signals and sends them to an NTSC reference signal generator 312, such as an MC1377DW. The reference signal generator 312 produces the reference NTSC baseband composite signal which is sent to the encoders 15 for each channel frequency. The reference signal may be shared and sent to each of the encoders 15 in the headend. Access controller 5 provides descrambling information to each of the encoders 15. The reference baseband composite signal is scrambled in each of a number of encoders 15. These scrambled reference signals are individually provided to a DC clamp circuit 316, such as an EL209OC DC clamping circuit. The DC clamp fixes a portion of the video signal, typically the back porch, at a predetermined voltage level. The video output from the DC clamp circuit is provided to a comparator 318, such as an LM319. The comparator 318 compares the video output to a reference level. The reference level is selected for distinguishing between digital ones and zeroes. In one embodiment, ones are represented by a 3.58 MHz signals and zeroes are a DC zero level. The reference level for the comparator 318 is about midway between the zero level and the maximum amplitude of the 3.5 MHz signals. The comparator may operate continuously but the only data of importance here is that on line 18 of the video signal. The data output from the comparator 318 is input to a data extractor 320, which can be implemented in a field programmable gate array and a microprocessor. The gate array also receives the NTSC sync signals. The sync signals are used to identify line 18 and extract the relevant data from line 18 of the video signal. The data is output to a microprocessor. The microprocessor performs the act of distributing the data to the appropriate VBI inserters 30. The data is addressed and sent out through a transceiver by the microprocessor to the inserters.

Figure 5:
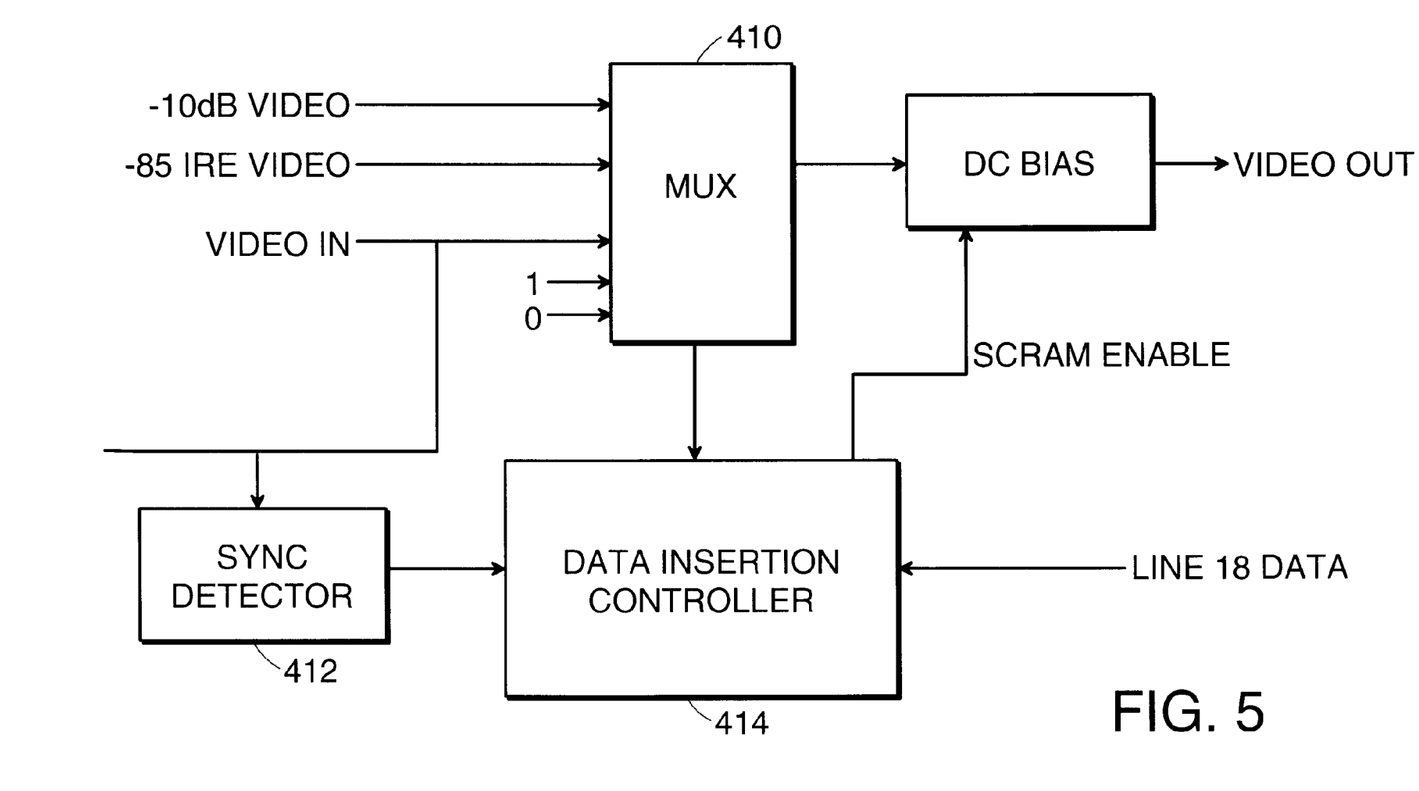
FIG. 5 is a schematic block diagram of an embodiment of a VBI inserter for use in the scrambling system of FIG. 1.

A VBI inserter 30 is shown in FIG. 5. The desired NTSC video signal 25 is directed into a multiplexer 410. The video signal is also processed to produce an attenuated video signal at −10 dB of the original signal. Also, independently the video signal level is offset by −85IRE. In order to provide the desired data, the multiplexer 410 also receives a reference "1" and a reference "0". Again in a preferred embodiment, a "1" is produced by a 3.58 MHz signal and a "0" is a DC level. All of these signals, the video signal, −85IRE video signal, −10 dB video signal, 3.58 MHz signal and the DC level are all fed into the multiplexer 410.

The video signal is also provided to a sync detector 412. The sync detector identifies the various sync signals in the video signal and provide them to a data insertion controller 414. The data insertion controller 414 also receives the line 18 VBI data from the data extractor 320. The controller 414 requests the data after line 18 has completed. It collects the data during the video signal so that it is ready to insert the new data when line 18 of the next frame appears. The controller stops receiving VBI data during line 18 and begins again when line 18 is over.

The data insertion controller 414 implements a desired scrambling algorithm by controlling which input is output by the multiplexor 410. Sync pulses are attenuated by selecting the −10 dB video. The occurrence of a sync pulse is determined by clocking from a previously detected sync pulse. In line 18 of the video, the "1" or "0" inputs are selected based upon the line 18 data to be inserted. Otherwise, the −85IRE video signal is selected to produce the scrambled video signal. If a signal is not to be scrambled, unscrambled video can be selected by the data insertion controller 414. When a scrambled signal is being output, a SCRAM ENABLE signal is generated and passed by the data insertion controller to a DC bias circuit 416. The DC bias circuit also receives the output from the multiplexor. The DC bias circuit is responsive to the SCRAM ENABLE signal to offset a scrambled video signal so as to make the voltage levels relatively the same for scrambled and unscrambled signals.

Of course, it should be understood that various changes and modifications to the preferred embodiments described above will be apparent to those skilled in the art. For example, the specific scrambling algorithms may be varied and yet still take advantage of the distributed scrambling of the embodiments described herein. This and other changes can be made without departing from the spirit and scope of the inventions and without diminishing its attendant advantages. It is, therefore, intended that such changes and modifications be covered by the following claims.

We claim:

1. A distributed scrambling method for a system in which a group of channel frequencies are reused over a plurality of service areas, each service area receiving different television signals over the group of channel frequencies, the method comprising the steps of:

providing signal authorization information for a channel frequency to a plurality of receiver/decoders located in different service areas, all assigned to the channel frequency;

providing descrambling information to an encoder, the encoder placing the descrambling information into a scrambled reference signal for a channel frequency to create a conditional access code;

extracting the conditional access code from the scrambled reference signal;

scrambling a television signal at each of a plurality of scrambling units, each scrambling unit producing a scrambled television signal for the channel frequency for delivery to a different one of the service areas;

distributing the conditional access code to each of the plurality of scrambling units; and inserting the conditional access code into the television signal at each scrambling unit, the conditional access code enabling a receiver/decoder having the signal authorization information to descramble the television signal.

2. The method of claim 1 wherein the extracting step removes the conditional access code from a vertical blanking interval of the scrambled reference signal.

3. The method of claim 1 wherein the extracting step removes the conditional access code from an audio subcarrier of the scrambled reference signal.

4. The method of claim 1 wherein the step of scrambling comprises suppressing a synchronization signal.

5. The method of claim 1 further comprising encrypting the descrambling information and wherein the signal authorization information includes a key for decrypting the conditional access code created by the encrypted descrambling information.

6. A scrambling system for a cable television system in which a group of channel frequencies are reused over a plurality of service areas, each service area receiving different television signals on the group of channel frequencies, the scrambling system comprising:

an access controller for providing signal authorization information for a channel frequency to a plurality of receiver/decoders located in different service areas, all assigned to the channel frequency;

an encoder, in signal communication with the access controller, for receiving descrambling information from the access controller corresponding to the signal authorization information for the channel frequency and for producing a conditional access code by placing the descrambling information into a scrambled reference signal for the channel frequency;

a plurality of scrambling units, each scrambling a television signal for the channel frequency for delivery to a different one of the service areas;

an extracting unit, in signal communication with the encoder, and the plurality of scrambling units, for removing the conditional access code from the scrambled reference signal and for distributing the conditional access code to each of the scrambling units; and means, associated with each scrambling unit, for inserting the conditional access code into the scrambled television signal.

7. The scrambling system according to claim 6 wherein the extracting unit removes the conditional access code from a vertical blanking interval of the scrambled reference signal.

8. The scrambling system according to claim 7 wherein the means for inserting comprises a vertical blanking interval inserter.

9. The scrambling system according to claim 6 wherein the extracting unit removes the conditional access code from an audio subcarrier of the scrambled reference signal.

10. The scrambling system of claim 9 wherein the means for inserting comprises an audio AM modulator.

* * * * *